US011599179B2

(12) United States Patent
Lin et al.

(10) Patent No.: US 11,599,179 B2
(45) Date of Patent: Mar. 7, 2023

(54) INTELLIGENT CONTROL OF A POWER SUPPLY SYSTEM OF AN INFORMATION HANDLING SYSTEM

(71) Applicant: Dell Products L.P., Round Rock, TX (US)

(72) Inventors: Chih-Lang Lin, Taipei (TW); Chia Ting Hu, New Taipei (TW); Hui-Chuan Chang, Kaohsiung (TW)

(73) Assignee: Dell Products L.P., Round Rock, TX (US)

( * ) Notice: Subject to any disclaimer, the term of this patent is extended or adjusted under 35 U.S.C. 154(b) by 51 days.

(21) Appl. No.: 17/243,121

(22) Filed: Apr. 28, 2021

(65) Prior Publication Data

US 2022/0350392 A1    Nov. 3, 2022

(51) Int. Cl.
| | |
|---|---|
| *G06F 1/3206* | (2019.01) |
| *H02M 3/335* | (2006.01) |
| *G06F 1/3296* | (2019.01) |
| *G06F 1/26* | (2006.01) |
| *H02M 1/32* | (2007.01) |

(52) U.S. Cl.
CPC ............ *G06F 1/3206* (2013.01); *G06F 1/263* (2013.01); *G06F 1/3296* (2013.01); *H02M 1/32* (2013.01); *H02M 3/33569* (2013.01)

(58) Field of Classification Search
CPC ...... G06F 1/3206; G06F 1/263; G06F 1/3296; H02M 1/32; H02M 3/33569
See application file for complete search history.

(56) References Cited

U.S. PATENT DOCUMENTS

| | | | |
|---|---|---|---|
| 2013/0275792 A1* | 10/2013 | Tabatabai | G06F 1/3203 |
| | | | 713/323 |
| 2014/0181546 A1* | 6/2014 | Hallberg | G06F 1/3296 |
| | | | 361/87 |
| 2014/0183974 A1* | 7/2014 | Proefrock | H02J 1/10 |
| | | | 307/130 |
| 2015/0077076 A1* | 3/2015 | Bhattad | G05F 1/56 |
| | | | 323/280 |
| 2017/0031410 A1* | 2/2017 | Muccini | G06F 1/30 |
| 2017/0116840 A1* | 4/2017 | Montero | G06F 1/3296 |
| 2017/0329380 A1* | 11/2017 | Hung | G06F 1/30 |
| 2017/0366022 A1* | 12/2017 | Yu | H02J 9/061 |

(Continued)

*Primary Examiner* — Aurel Prifti
(74) *Attorney, Agent, or Firm* — Terrile, Cannatti & Chambers; Stephen A. Terrile (57) ABSTRACT

A system, method, and non-transitory computer-readable medium are disclosed for intelligently controlling a power supply system of an information handling system. At least one embodiment is directed to a method that includes receiving power from an adapter and providing the power from the adapter to a switching power supply. At least one embodiment of the method also includes controlling the plurality of power switching elements to provide system power to an information handling system through the switching power supply; detecting a light loading power condition of the information handling system. In response to detecting the light loading power condition, the switching power supply is deactivated and a bypass control module is activated. In at least one embodiment, activation of the bypass control module directs power from the adapter through the bypass control module to the information handling system as the system power.

17 Claims, 6 Drawing Sheets

(56) References Cited

U.S. PATENT DOCUMENTS

| | | | | |
|---|---|---|---|---|
| 2017/0366029 | A1* | 12/2017 | McKenna | H02J 9/065 |
| 2018/0364784 | A1* | 12/2018 | Luo | G06F 13/4072 |
| 2019/0033946 | A1* | 1/2019 | Sultenfuss | G06F 1/305 |
| 2019/0243440 | A1* | 8/2019 | Meinerzhagen | G06F 1/26 |
| 2019/0319545 | A1* | 10/2019 | Wang | H02M 7/064 |
| 2020/0336001 | A1* | 10/2020 | Zhang | H02J 13/00002 |
| 2021/0232206 | A1* | 7/2021 | Matula | G06F 1/28 |

* cited by examiner

INTELLIGENT CONTROL OF A POWER SUPPLY SYSTEM OF AN INFORMATION HANDLING SYSTEM

BACKGROUND OF THE INVENTION

Field of the Invention

The present invention relates to information handling systems. More specifically, embodiments of the invention relate to a system and method for the intelligent control of a power supply system of an information handling system.

Description of the Related Art

As the value and use of information continue to increase, individuals and businesses seek additional ways to process and store information. One option available to users is an information handling system (IHS). An IHS generally processes, compiles, stores, and/or communicates information or data for business, personal, or other purposes, thereby allowing users to take advantage of the value of the information. Because technology and information handling needs and requirements vary between different users or applications, IHS may also vary regarding what information is handled, how the information is handled, how much information is processed, stored, or communicated, and how quickly and efficiently the information may be processed, stored, or communicated. IHS variations allow for information handling systems to be general or configured for a specific user or specific use, such as financial transaction processing, airline reservations, enterprise data storage, or global communications. Also, information handling systems may include various hardware and software components that may be configured to process, store, and communicate information and may include one or more computer systems, data storage systems, and networking systems.

IHSs employ power supply systems to provide system power to the various components of the IHS. Such power supply systems can often power the IHS from a battery and/or an adapter (e.g., an AC adapter). Power supply system design has become increasingly important as the power requirements of IHSs, such as portable laptop devices, evolve.

SUMMARY OF THE INVENTION

A system, method, and non-transitory computer-readable medium are disclosed for intelligently controlling a power supply system of an information handling system. At least one embodiment is directed to a method that includes receiving power from an adapter and providing the power from the adapter to a switching power supply having a switching network including a plurality of power switching elements. At least one embodiment of the method includes controlling the plurality of power switching elements to provide system power to an information handling system through the switching power supply; detecting a light loading power condition of the information handling system; and in response to detecting the light loading power condition of the information handling system, activating a bypass control module and deactivating the switching power supply. In at least one embodiment, activation of the bypass control module directs power from the adapter through the bypass control module to the information handling system as the system power.

At least one embodiment is directed to a power supply system for an information handling system. In at least one embodiment, the power supply system includes a power port configured for connection to an adapter and a power supply system configured to receive power from the adapter through the power port. In at least one embodiment, the power supply system is operable in a first mode of operation in which system power is provided to the information handling system by a switching power supply having a plurality of switching elements. In at least one embodiment, the power supply system is operable in a second mode of operation in which the system power is provided to the information handling system by the adapter. In at least one embodiment, the switching elements of the switching power supply are deactivated in the second mode of operation. The system also includes a power control system configured to operate the power supply system in the first mode of operation and the second mode of operation. In at least one embodiment, the power control system operates the power supply system in the second mode of operation when the information handling system is in a light loading power condition, and operates the power supply system in the first mode of operation when the information handling system exits the light loading power condition.

At least one embodiment is directed to a non-transitory, computer-readable storage medium embodying computer program code, where the computer program code comprises instructions that are executable by an embedded controller of a power supply system. In at least one embodiment, the instructions are configured for directing a power supply system to operate in a first mode of operation in which system power is provided to an information handling system by a switching power supply having a plurality of switching elements. In the first mode of operation, power is provided to the plurality of switching elements from an adapter. The instructions are further configured for detecting a light loading power condition of the information handling system. In response to detecting the light loading power condition of the information handling system, the instructions are executable to direct the power supply system to operate in a second mode of operation in which system power is provided to the information handling system by the adapter. In at least one embodiment the instructions are configured to deactivate the switching power supply in the second mode of operation.

BRIEF DESCRIPTION OF THE DRAWINGS

The present invention may be better understood, and its numerous objects, features, and advantages made apparent to those skilled in the art by referencing the accompanying drawings. The use of the same reference number throughout the several figures designates a like or similar element.

DETAILED DESCRIPTION

Systems, methods, and computer-readable mediums are disclosed to intelligently control the operation of a power supply system in an information handling system (IHS). Certain embodiments of the power supply system include a power port configured for connection to an adapter, where the power supply system is configured to receive power from the adapter through the power port. In certain embodiments, the power port is configured as a USB C Power Delivery (USB C-PD) port. In certain embodiments, the power supply system is operable in a first mode of operation in which system power is provided to the information handling system by a switching power supply having a plurality of switching components. In certain embodiments, the power supply system is operable in a second mode of operation in which the system power is provided to the information handling system by the adapter, and the switching components of the switching power supply are deactivated. By effectively bypassing and deactivating the switching power supply in the second mode of operation, power transfer efficiency between the adapter and the IHS system is increased, and noise that would otherwise occur due to the switching actions of the switching power supply is eliminated.

Certain embodiments include a power control system that is configured to operate the power supply system in the first mode of operation and the second mode of operation. In at least one embodiment, the power control system operates the power supply system in the second mode of operation when the information handling system is in a light loading power condition. In certain embodiments, the power control system operates the power supply system in the first mode of operation when the information handling system exits the light loading power condition.

Certain embodiments employ a bypass control module that is deactivated in the first mode of operation and activated in the second mode of operation. In the first mode of operation, the bypass control module is configured to direct power from the adapter to the switching components of the switching power supply to provide system power to the information handling system using the switching power supply. In the second mode of operation, the bypass control module is configured to direct power from the adapter through the bypass control module for provision as system power to the information handling system.

In certain embodiments, the power supply system includes an embedded controller that executes code that is configured to direct the power supply system to operate in either the first or second mode of operation in response to whether the information processing system is operating in a light loading power condition. To this end, certain embodiments of the embedded controller are configured to communicate with a charger controller of the switching power supply and a power delivery device over, for example, an SMBus. The power delivery device, in certain embodiments, is configured to respond to commands received from the embedded controller to direct the adapter to provide a voltage output at predetermined voltage output levels.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a desktop or laptop computer, a mobile phone, a mobile tablet device, a network storage device, an intelligent device controlling operations on a manufacturing floor, or any other suitable device. An IHS may vary in size, shape, performance, functionality, and price. The IHS may include random access memory (RAM), one or more processing resources such as a central processing unit (CPU) or hardware or software control logic, ROM, and/or other non-volatile memory types. Additional components of the IHS may include one or more disk drives, one or more network ports for communicating with external devices, as well as various input and output (I/O) devices, such as a keyboard, a mouse, and a video display. The IHS may also include one or more buses operable to transmit communications between the various hardware components.

Figure 1:
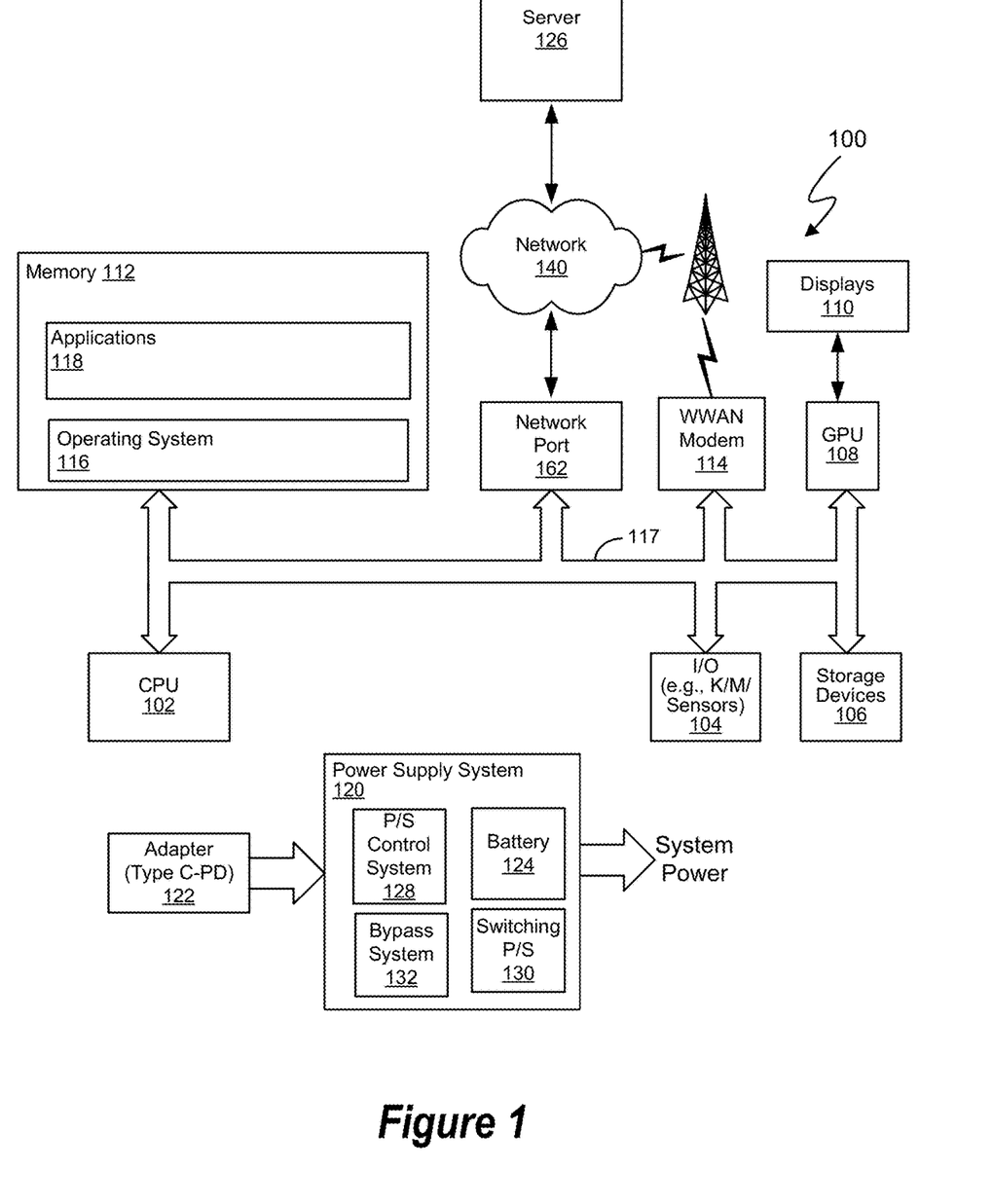
FIG. 1 is a generalized illustration of an information handling system (IHS) that is configured with a power supply system implemented in accordance with certain embodiments of the present disclosure.

FIG. 1 is a generalized illustration of an IHS 100 that is configured in accordance with certain embodiments of the system and method of the present disclosure. The IHS 100 includes a processor (e.g., central processor unit or "CPU") 102, input/output (I/O) devices 104, and a hard drive or disk storage 106. The IHS 100 may also include one or more GPUs 108 configured to control one or more displays 110.

In various embodiments, the IHS 100 also includes network port 162 and WWAN modem 114. The network port 162 may be configured to connect to a network 140, such as the Internet or other network, to access various servers, such as server 142. The WWAN modem 114 may be configured to connect to the network 140 using, for example, a mobile broadband communication standard.

The IHS 100 likewise includes system memory 112, which is interconnected to the foregoing via one or more buses 117. System memory 112 further comprises an operating system (OS) 116 and a plurality of user applications 118.

In the example shown in FIG. 1, the IHS 100 includes a power supply system 120, which provides system power to the components of the IHS 100 using either an adapter 122 or a battery 124. In certain embodiments, the adapter 122 is connected to receive AC power from an external source, such as shore power. In certain embodiments, the adapter 122 connects to the IHS using a USB C-PD port, which allows the power supply system to communicate with the adapter 122 over, for example, a control channel.

The power supply system 120 is operable in at least a first mode of operation and a second mode of operation as directed by a power supply control system 128. In the first mode of operation, power is provided from the adapter 122 to a switching power supply 130. The switching power supply 130 is configured to use the power from the adapter to generate the system power to the IHS. In certain embodiments, the switching power supply 130 is configured as a buck-boost converter.

In the second mode of operation, the power supply control system 128 effectively deactivates the switching power supply 130 and activates a bypass system 132. In certain embodiments, the activated bypass system 132 passes power from the adapter 122 to the output of the power supply system as the system power to the components of the IHS 100. In certain embodiments, the power supply control system 128 directs the power supply system 120 to operate in the second mode of operation when the power supply control system 128 detects that the IHS is operating in a light loading power condition. In certain embodiments, a light loading power condition is detected when the IHS is in an idle state. In certain embodiments, a light loading power condition is detected when the IHS is in the Connected or Modern Standby Mode. Connected Standby and Modern Standby enable an instant on/instant off user experience. In certain embodiments, such standby modes allow the IHS to stay connected, for example, to network 140 and a low power mode. Upon exit from a light loading power condition, the power supply control system 128 directs the power supply system 120 to operate in the first mode of operation by deactivating the bypass system 132 (thereby directing power from the adapter 122 to the switching power supply 130) and enabling active operation of the switching power supply 130.

Figure 2:
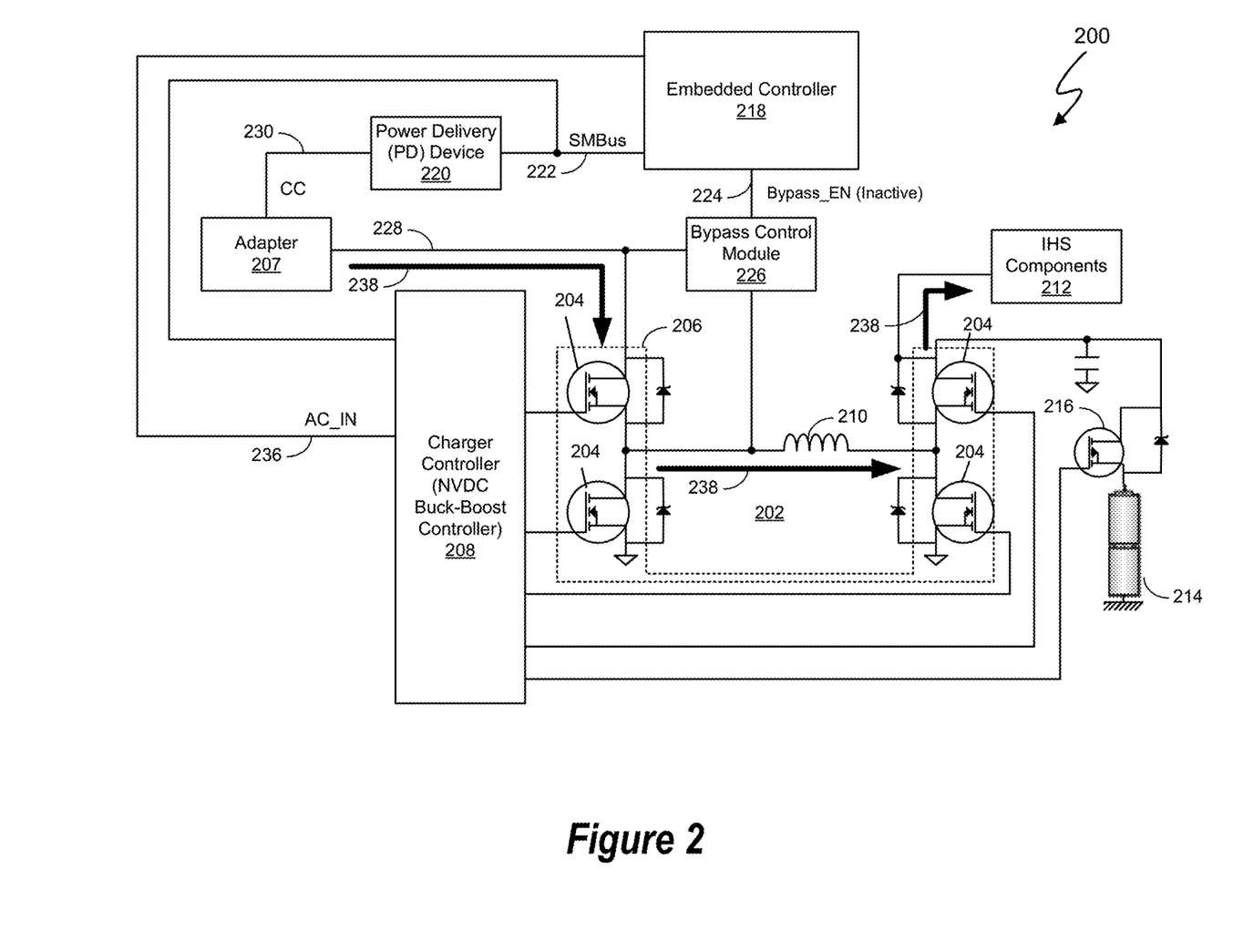
FIG. 2 is a schematic diagram of an exemplary power supply system used in certain embodiments of the disclosed system while operating in a first mode of operation.

FIG. 2 is a schematic diagram of an exemplary power supply system 200 used in certain embodiments of the disclosed system. The power supply system 200 shown in FIG. 2 can operate in the first mode of operation and second mode of operation as described herein. In FIG. 2, the power supply system 200 is shown operating in the first mode of operation. To this end, a power supply system 200 includes a switching power supply 202 having a plurality of power switching elements 204 (e.g., power MOSFETs) that form a power switching network 206. Power is provided to the power switching elements 204 of the power switching network 206 from an adapter 207. The power switching elements 204 of the power switching network 206 are activated and deactivated under the control of a charger controller 208 to selectively direct power through a passive element, shown in FIG. 2 as an inductor 210. In the first mode of operation, system power is provided to the components 212 of the IHS through the power switching network 206.

Certain embodiments of the power supply system 200 include an embedded controller 218. In the example shown in FIG. 2, the embedded controller 218 communicates with a power delivery device 220 and the charger controller 208 over a communication bus 222, such as an SMBus. In certain embodiments, the embedded controller 218 is also configured to generate a bypass control signal 224 (Bypass_EN) to a bypass control module 226.

In certain embodiments, the embedded controller 218 is used to detect whether the IHS is operating in a light loading power condition. When the IHS is not operating in a light loading power condition, the embedded controller 218 controls the power supply system 200 to operate in the first mode of operation. To this end, the embedded controller 218 communicates with the power delivery device 220 to adjust (e.g., raise) the voltage output 228 of the adapter 207 to a predetermined voltage level. In turn, the power delivery device 220 communicates with the adapter 207 over a control channel 230 (e.g., a control channel of a USB C-PD connector) to direct the adapter 207 to provide voltage output 228 at the predetermined voltage level needed for operating power supply system 200 in the first mode of operation.

Certain embodiments of the adapter 207 may be controlled to selectively provide voltage outputs of 5 VDC, 9 VDC, 12 VDC, 15 VDC, and/or 20 VDC. While operating in the first mode of operation, the adapter 207 is generally directed to provide a higher voltage output (e.g., 15 VDC, 20 VDC, etc.) when compared to the voltage output of the adapter 207 while operating the power supply system 200 in the second mode of operation (e.g., 9 VDC or 5 VDC, depending on the charged voltage of the batteries 214). In the first mode of operation, the embedded controller 218 communicates with the power delivery device 220 to instruct the power delivery device 220 of the need for the increased voltage output level from the adapter 207, and the power delivery device 220 communicates with the adapter 207 to set the voltage output of the adapter 207 at the voltage level needed for operation in the first mode of operation of the power supply system 200.

In the first mode of operation of the power supply system 200, the embedded controller 218 communicates with the charger controller 208 to direct the charger controller 208 to actively operate the power switching network 206 of the switching power supply 202. Additionally, the embedded controller 218 deactivates the bypass control signal 224 to place the bypass control module 226 in a deactivated state. In the deactivated state, the bypass control module 226 is effectively disconnected from the voltage output 228 of the adapter 207, thereby directing power from the adapter 207 to the power switching elements 204 of the power switching network 206 of the switching power supply 202. Power flow from the adapter 207, through the switching power supply 202, to the IHS components 212 during operation of the power supply system 200 in the first mode of operation is shown by arrows 238.

In certain embodiments, the power at the output of the switching power supply 202 is also used to charge batteries 214. During charging, the charger controller 208 activates charging switch 216 (e.g., MOSFET) to connect the output of the switching power supply 202 to the batteries 214. The charging switch 216 is deactivated to disconnect the batteries 214 from the output of the switching power supply 202 when the batteries 214 are charged, for example, to a predetermined voltage level. The charging switch 216 is in an activated state when the IHS is running on battery power.

In certain embodiments, the embedded controller 218 provides an AC present signal 236 (AC_IN) to the charger controller 208 indicative of whether the adapter 207 is connected to AC power.

Figure 3:
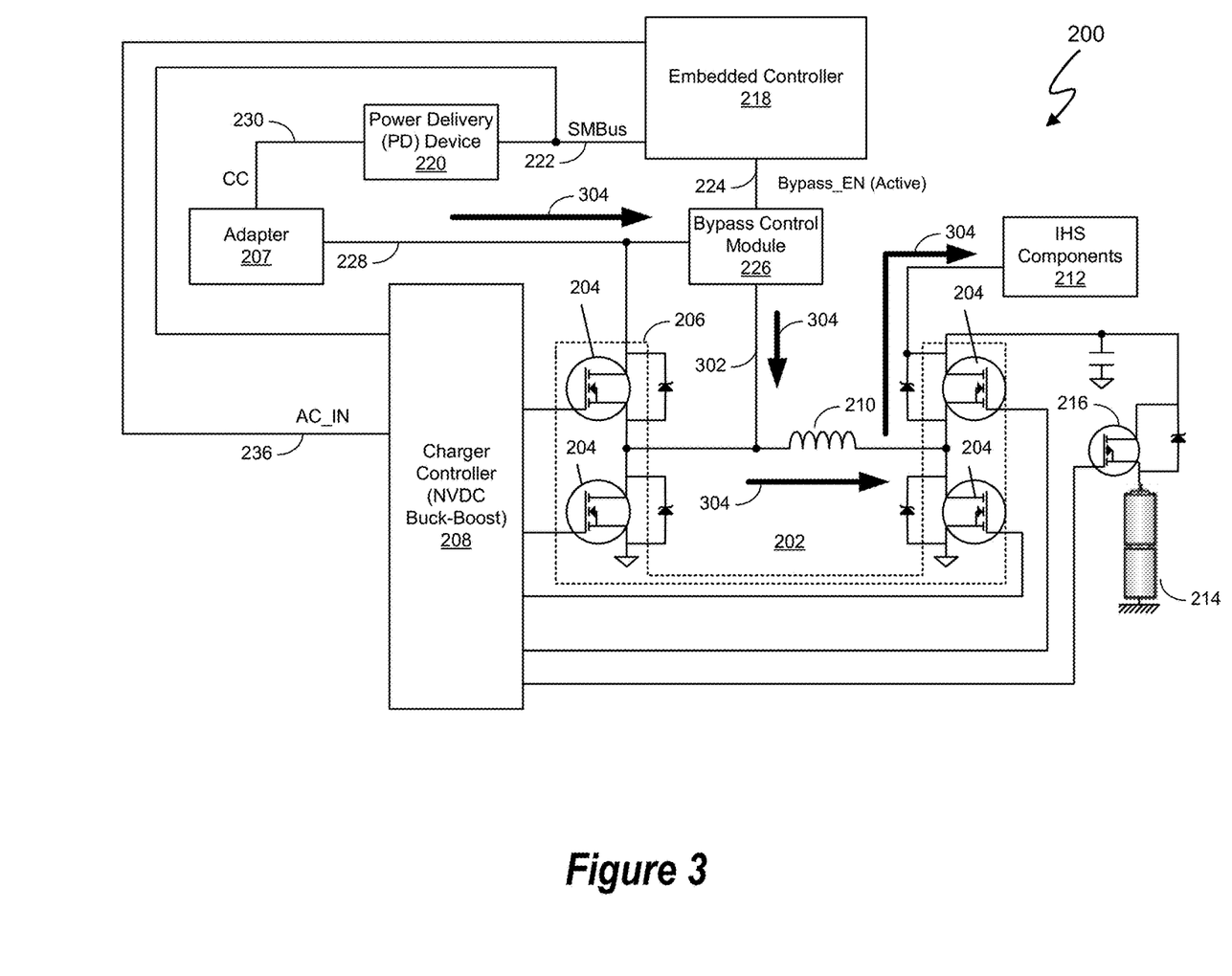
FIG. 3 is a schematic diagram of an exemplary power supply system used in certain embodiments of the disclosed system while operating in a second mode of operation.

FIG. 3 is a schematic diagram of an exemplary power supply system 200 used in certain embodiments of the disclosed system while operating in the second mode of operation. In this regard, the embedded controller 218 controls the power supply system 200 to operate in the second mode of operation when the IHS is operating in a light loading power condition. In the second mode of operation, the embedded controller 218 communicates with the charger controller 208 to deactivate the power switching elements 204 of the power switching network 206. Additionally, the embedded controller 218 communicates with the power delivery device 220 to direct the adapter 207 to reduce the voltage output 228 to a lower predetermined voltage level (e.g., 9 VDC or 5 VDC, depending, for example, on the voltage of the charged batteries 214).

In the second mode of operation, the embedded controller 218 also drives the bypass control signal 224 to an active state. In response, the bypass control module 226 effectively through-connects the power at the voltage output 228 of the adapter 207 to an output 302 of the bypass control module 226. As such, power in the embodiment shown in FIG. 3 flows from the adapter 207 through the bypass control module 226 and inductor 210 to provide supply system power to the IHS components 212. The flow of power through the power supply system 200 while in the second mode of operation is shown by arrows 304.

Figure 4:
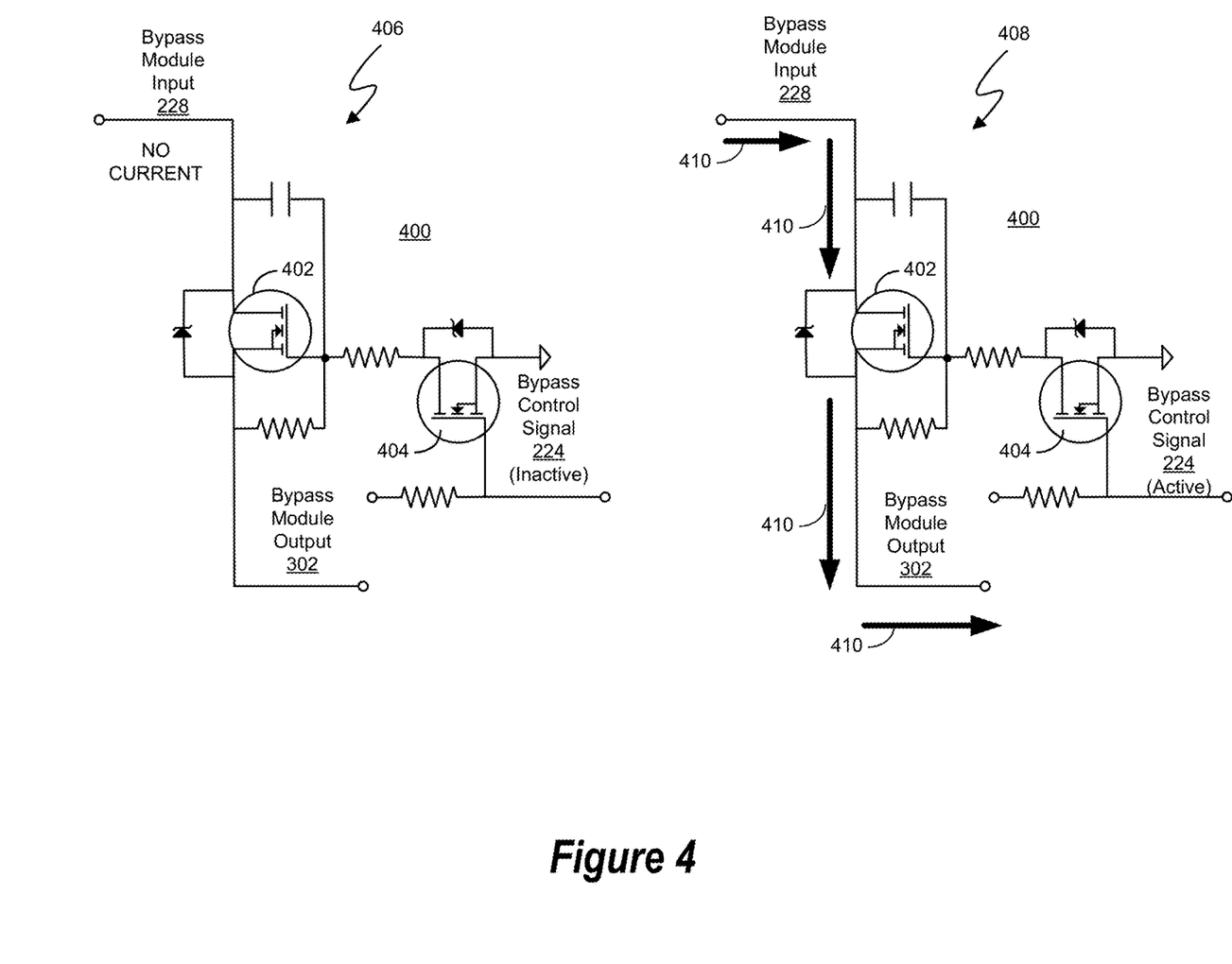
FIG. 4 is a schematic diagram of an exemplary embodiment of a bypass control module that may be used in certain embodiments of the disclosed system.

FIG. 4 is a schematic diagram of an exemplary embodiment of a bypass control module 400 that may be used in certain embodiments of the disclosed system. In the example shown in FIG. 4, the bypass control module 400 includes first and second N-channel MOSFETs 402 and 404. The drain of the N-channel MOSFET 402 serves as the input for the bypass control module 400 and receives the power provided by the adapter. The source of the N-channel MOSFET 402 serves as the output 302 of the bypass control module 400. The gate of the N-channel MOSFET 402 is activated and deactivated by the N-channel MOSFET 404, which has its drain connected to the gate of the N-channel MOSFET 402. The N-channel MOSFET 404, in turn, is activated and deactivated by the bypass control signal 224 provided to the gate terminal of the N-channel MOSFET 404 by the embedded controller.

The bypass control module 400 is shown in a deactivated state at 406 and in an activated state at 408. In the deactivated state, the bypass control signal 224 is in an inactive state so that neither N-channel MOSFET 402 nor N-channel MOSFET 404 are conductive. As such, no current flows through the bypass control module 400 when it is in the deactivated state shown at 406. However, in the activated state shown at 408, the bypass control signal 224 is in an active state, thereby driving N-channel MOSFET 404 to a conductive state. When N-channel MOSFET 404 is in a conductive state, the N-channel MOSFET 402 is also driven to a conductive state, thereby allowing to current flow from the bypass module input (e.g., from the voltage output 228) to the bypass module output 302 through the N-channel MOSFET 402 as shown by arrows 410. It will be recognized, in view of the teachings of the present disclosure, that other bypass control module configurations may also be used, the foregoing being a non-limiting example.

Figure 5:
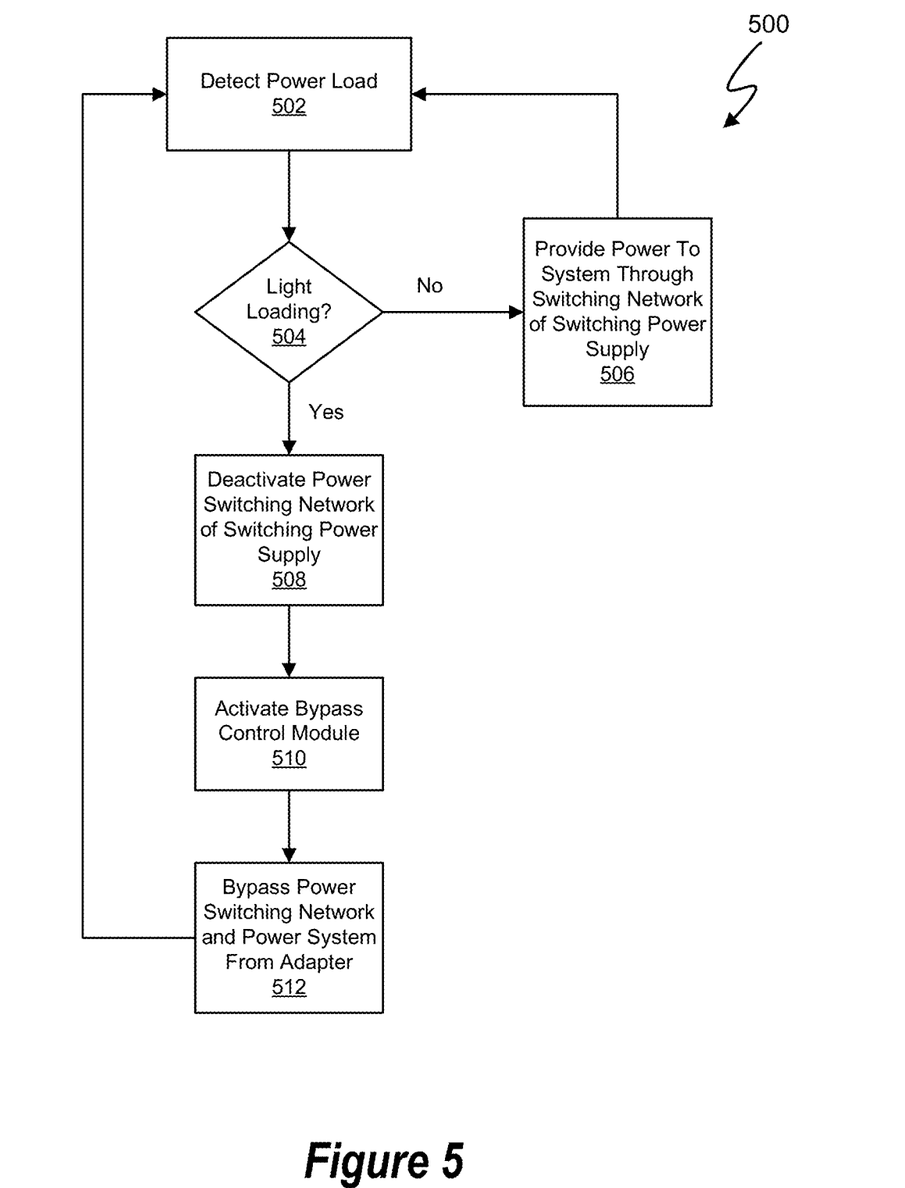
FIG. 5 is a flowchart depicting exemplary operations that may be executed in certain embodiments of the disclosed system.

FIG. 5 is a flowchart 500 depicting exemplary operations that may be executed in certain embodiments of the disclosed system. In this example, the power loading condition of the IHS is detected at operation 502. At operation 504, a determination is made as to whether the power loading condition is a light loading power condition. If the detected power loading condition is not a light loading power condition, power is provided to the components of the IHS through the switching network of a switching power supply at operation 506. However, if the power loading condition is a light loading power condition, the power switching network of the switching power supply is deactivated at operation 508, and a bypass module is activated at operation 510. The deactivation of the switching network at operation 508 and activation of the bypass control module at operation 510 result in the provision of power from the adapter to the components of the IHS in which the switching network of the switching power supply is effectively bypassed.

Figure 6:
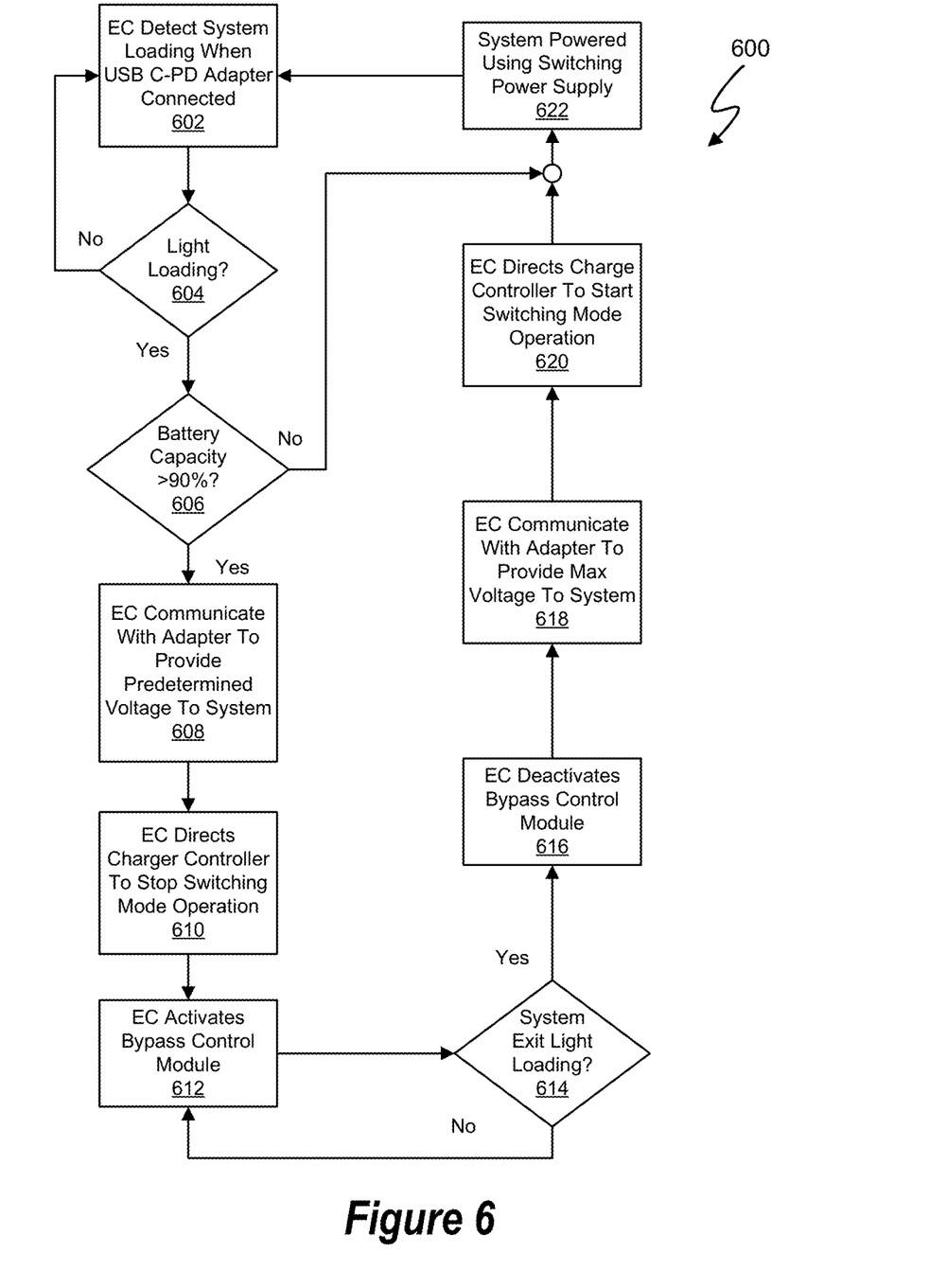
FIG. 6 is a flowchart depicting exemplary operations that may be executed in certain embodiments of the disclosed system.

FIG. 6 is a flowchart 600 depicting exemplary operations that may be executed in certain embodiments of the disclosed system. In this example, an embedded controller detects system loading when a USB C-PD is connected at operation 602. A determination is made at operation 604 as to whether the loading is a light loading power condition. If the loading condition is not a light loading power condition, the IHS is powered using the searching power supply at 622. The loading condition is detected again at operation 602 and checked at operation 604 until a determination is made that the loading condition is a light loading power condition at operation 604. While the loading condition is not a light loading power condition, system power is provided through a switching power supply at operation 622, such as a buck-boost mode switching power supply, that receives power from an adapter.

If a determination is made at operation 604 that the loading condition is a light loading power condition, a check is made at operation 606 as to whether the battery capacity is above a predetermined threshold, such as 90%. The battery capacity check is made so that the output of the adapter is not used as the power output of the power supply system if the batteries still require charging. If the battery capacity is not above the predetermined threshold, system power is provided through the switching power supply in the light loading power condition while the batteries are charged.

However, if the battery capacity is above the predetermined threshold, an embedded controller of the power supply system communicates with the adapter at operation 608 (e.g., through a power delivery device) to direct the adapter to provide a predetermined voltage output. The predetermined voltage output is typically lower than the voltage output when the IHS is not operating in the light loading power condition. At operation 610, the embedded controller directs a charge controller of the switching power supply to stop the switching mode of operation. At operation 612, the embedded controller activates a bypass control module, which directs power from the adapter as the system power to the IHS.

The power supply system continues to direct power from the adapter as system power to the IHS so long as the IHS is operating in a light loading power condition as determined at operation 614. However, if a determination is made at operation 614 that the IHS is no longer operating in the light loading power condition, the embedded controller deactivates the bypass control module at operation 616 and communicates with the adapter to provide an increased voltage level (e.g., maximum available voltage) to the power supply system at operation 618. At operation 620, the embedded controller directs the charge controller of the switching power supply to operate in the switching mode so that system power is provided by the switching power supply at operation 622.

As will be appreciated by one skilled in the art, the disclosed system may be embodied as a method, system, or computer program product. Accordingly, embodiments of the disclosed system may be implemented in hardware, in software (including firmware, resident software, microcode, etc.) or in an embodiment combining software and hardware. Furthermore, the disclosed system may take the form of a computer program product on a computer-usable storage medium having computer-usable program code embodied in the medium.

Any suitable computer-usable or computer-readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the disclosed system may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the disclosed system are described with reference to flowchart illustrations and/or block diagrams of methods, apparatus (systems) and computer program products according to embodiments of the disclosed system. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The disclosed system is well adapted to attain the advantages mentioned as well as others inherent therein. While the disclosed system has been depicted, described, and is defined by reference to particular embodiments, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention. Consequently, the invention is intended to be limited only by the spirit and scope of the appended claims, giving full cognizance to equivalents in all respects.

What is claimed is:

1. A method comprising:
   receiving power from an adapter;
   providing the power from the adapter to a switching power supply having a switching network including a plurality of power switching elements;
   controlling the plurality of power switching elements to provide system power to an information handling system through the switching power supply;
   detecting a light loading power condition of the information handling system;
   in response to detecting the light loading power condition of the information handling system,
   deactivating the switching power supply, and
   activating a bypass control module wherein
      activation of the bypass control module directs power from the adapter through the bypass control module to the information handling system as the system power;
   detecting the light loading power condition at an embedded controller of the information handling system;
   activating a bypass control signal at an output of the embedded controller in response to the detection of the light loading power condition; and
   receiving the bypass control signal at an input of the bypass control module to activate the bypass control module, wherein
      activation of the bypass control module directs power from the adapter to the information handling system as the system power.

2. The method of claim 1, further comprising:
   deactivating the plurality of power switching elements in response to detection of the light loading power condition to thereby deactivate the switching power supply.

3. The method of claim 1, further comprising:
   controlling the switching of the plurality of switching elements of the switching network using a charger controller during operation of the switching power supply.

4. The method of claim 1, further comprising:
   detecting that the information handling system is no longer operating in the light loading power condition;
   in response to detecting that the information handling system is no longer operating in the light loading power condition,
   deactivating the bypass control module to direct power from the adapter to the switching network; and
   controlling the plurality of power switching elements to activate the switching power supply to provide system power to the information handling system.

5. A method comprising:
   receiving power from an adapter;
   providing the power from the adapter to a switching power supply having a switching network including a plurality of power switching elements;
   controlling the plurality of power switching elements to provide system power to an information handling system through the switching power supply;
   detecting a light loading power condition of the information handling system;
   in response to detecting the light loading power condition of the information handling system,
   deactivating the switching power supply, and
   activating a bypass control module wherein
      activation of the bypass control module directs power from the adapter through the bypass control module to the information handling system as the system power;
   controlling the plurality of power switching elements to provide system power to the information handling system using a charger controller when system power is provided by the switching power supply;
   detecting the light loading power condition at an embedded controller of the information handling system;

using the embedded controller to communicate with the charger controller to instruct the charger controller to deactivate the switching power supply;

using the embedded controller to communicate with a power delivery device, wherein the power delivery device directs the adapter to adjust a voltage output of the adapter to a predetermined voltage level;

activating a bypass control signal at an output of the embedded controller in response to the detection of the light loading power condition; and receiving the bypass control signal at an input of the bypass control module to activate the bypass control module, wherein activation of the bypass control module directs power from the adapter to the information handling system as the system power.

6. The method of claim 5, wherein
the embedded controller communicates with a power delivery device to direct the adapter to reduce the voltage output of the adapter to the predetermined voltage level.

7. The method of claim 5, further comprising:
detecting that the information handling system is no longer operating in the light loading power condition;
deactivating the bypass control signal at the output of the embedded controller in response to detecting that the information handling system is no longer operating in the light loading power condition;
receiving the deactivated bypass control signal at the bypass control module to deactivate the bypass control module, wherein
deactivating the bypass control module inhibits power flow through the bypass control module, and
deactivating the bypass control module directs power from the adapter to the switching network;
using the embedded controller to direct the adapter to adjust the voltage output of the adapter to a further predetermined voltage level;
using the embedded controller to communicate with the charger controller to instruct the charger controller to control the plurality of switching elements of the switching network to provide system power to the information handling system from the switching power supply; and
controlling the plurality of power switching elements using the charger controller to provide system power to the information handling system through the switching power supply.

8. The method of claim 7, wherein
the embedded controller communicates with a power delivery device to instruct the adapter to raise the voltage output of the adapter to the further predetermined voltage output level.

9. An information handling system comprising:
a power port configured for connection to an adapter;
a power supply system configured to receive power from the adapter through the power port, wherein
the power supply system is operable in a first mode of operation in which system power is provided to the information handling system by a switching power supply having a plurality of switching elements, and
the power supply system is operable in a second mode of operation in which the system power is provided to the information handling system by the adapter, wherein the switching power supply is deactivated in the second mode of operation; and a power control system configured to operate the power supply system in the first mode of operation and the second mode of operation, wherein
the power control system operates the power supply system in the second mode of operation when the information handling system is in a light loading power condition, and
the power control system operates the power supply system in the first mode of operation when the information handling system exits the light loading power condition;
a charger controller configured to control the switching elements of the switching power supply to control power provided by the switching power supply when the power supply is operating in the first mode of operation;
a power delivery device configured for communication with the adapter; and
an embedded controller configured for communication with the charger controller, the bypass control module, and the power delivery device.

10. The system of claim 9, wherein the power control system comprises:
a bypass control module configured to direct power from the adapter through the bypass control module for provision as system power to the information handling system when the power supply system is operating in the second mode of operation; and
the bypass control module is configured to direct power from the adapter to the switching elements of the switching power supply when the power supply system is operating in the first mode of operation.

11. The system of claim 10, wherein
the bypass control module is configured to direct power from the adapter to the switching elements of the switching power supply by preventing power flow through the bypass control module in the first mode of operation.

12. The system of claim 9, wherein the embedded controller is configured for:
detecting the light loading power condition of the information handling system; and
in response to detecting that the information handling system is in the light loading power condition,
instructing the charger controller to direct the switching elements of the switching power supply to an inactive state in response to the detection of the light loading power condition to thereby deactivate the switching power supply;
instructing the power delivery device to instruct the adapter to adjust a voltage output of the adapter to a predetermined voltage level; and
providing an active bypass control signal to the bypass control module in response to the detection of the light loading power condition, wherein the bypass control module is responsive to the active bypass control signal to direct power from the adapter through the bypass control module for provision as system power to the information handling system.

13. The system of claim 12, wherein the embedded controller is further configured for:
detecting that the information handling system is no longer in the light loading power condition; and
in response to detecting that the information handling system is no longer in the light loading power condition, instructing the power delivery device to direct the adapter to adjust the voltage output of the adapter to a predetermined voltage level, deactivating the bypass control signal to the bypass control module, wherein the deactivation of the bypass control module directs power from the adapter to the switching elements of the switching power supply, and instructing the charger controller to control the switching elements of the switching power supply to provide the system power to the information handling system.

14. The system of claim 10, wherein
the switching power supply is a buck-boost switching power supply.

15. A non-transitory, computer-readable storage medium embodying computer program code, the computer program code comprising instructions executable by an embedded controller, the instructions being configured for:

directing a power supply system to operate in a first mode of operation in which system power is provided to an information handling system by a switching power supply having a plurality of switching elements, wherein power is provided to the plurality of switching elements from an adapter; and detecting a light loading power condition of an information handling system;

in response to detecting the light loading power condition of the information handling system,
directing the power supply system to operate in a second mode of operation, wherein
the system power is provided to the information handling system by the adapter, and
the switching power supply is deactivated;

communicating with a charger controller of the switching power supply to direct operation of the charger controller in the first mode of operation and the second mode of operation, wherein the charger controller is directed to provide power through the switching elements of the switching power supply in the first mode of operation of the power supply system, and the charger controller is directed to deactivate the switching power supply in the second mode of operation.

16. The non-transitory, computer-readable storage medium of claim 15, wherein the instructions are further configured for:

communicating with a power delivery device to direct the adapter to adjust a voltage output of the adapter, wherein the adapter is directed to adjust the voltage output of the adapter to a first predetermined voltage level in the first mode of operation of the power supply system, and the adapter is directed to adjust the voltage output of the adapter to a second predetermined voltage level in the second mode of operation of the power supply system, and the first predetermined voltage level is greater than the second predetermined voltage level.

17. The non-transitory, computer-readable storage medium of claim 15, wherein the instructions are further configured for:

generating a bypass control signal to a bypass control module, wherein an activated state of the bypass control signal is generated in the second mode of operation, and
in response to receipt of the activated state of the bypass control signal,
the bypass control module is configured to direct power from the adapter through the bypass control module for provision as system power to the information handling system, and a deactivated state of the bypass control signal is generated in the first mode of operation, in response to a deactivated state of the bypass control signal, the bypass control module is configured to direct power from the adapter to the switching elements of the switching power supply.

\* \* \* \* \*